Patented Oct. 23, 1951

2,572,567

UNITED STATES PATENT OFFICE 2,572,567

ORGANIC SULFENYL THIOCYANATES

Chester M. Himel, Palo Alto, Calif., and Lee O. Edmonds, Bartlesville, Okla., assignors to Phillips Petroleum Company, a corporation of Delaware No Drawing. Application December 12, 1949, Serial No. 132,628

13 Claims. (Cl. 260—454)

This invention relates to a process for the preparation of an organic sulfenyl thiocyanate. In one embodiment of the invention it relates to the preparation of an alkyl sulfenyl thiocyanate by interaction between an alkyl thiosulfenyl halide and an inorganic metal cyanide. The process of the invention can be effected by bringing together a thiosulfenyl halide and a metal cyanide, or by admixing a solution of a thiosulfenyl halide in an organic solvent and an aqueous metal hydroxide solution and adding hydrogen cyanide to the resulting mixture.

The organic sulfenyl thiocyanate products of the present invention are useful for various commercial purposes. Thus, they may be used as pest-control agents, e. g., insecticides, bactericides, fungicides, and as intermediates in the preparation of other chemical compounds.

A method of the prior art as reported in the literature involves the reaction of a mercaptan with thiocyanogen. This process is not entirely satisfactory because of the loss of reactants and the difficulty of recovery since an excess of thiocyanogen is required to obtain desirable yields of the sulfenyl thiocyanate and in the recovery of the product the excess of thiocyanogen and thiocyanic acid by-product must be decomposed in order to permit the isolation of the desired product. In our copending application, Serial No. 66,584, filed December 21, 1948, another method, particularly adaptable for the preparation of the tertiary alkyl derivatives, is described for the production of sulfenyl thiocyanates from the interaction of corresponding alkyl sulfenyl halides with selected metal salts of thiocyanic acid.

We have now found that organic sulfenyl thiocyanates can be readily prepared and recovered by the interaction of organic thiosulfenyl halies with a metal cyanide. In a preferred manner of preparation, the organic thiosulfenyl halide is dissolved in an organic solvent, preferably a low-boiling hydrocarbon, and to this solution is added a selected metal cyanide which may conveniently be added as an aqueous solution thereof. The solvent is flashed off and the product is easily recovered by fractionation, preferably at reduced pressures. In a modification of the process a mixture of an organic so'ution of the thiosulfenyl halide and aqueous metal hydroxide solution may be contacted with hydrogen cyanide under the conditions described below to effect the formation of the sulfenyl thiocyanate.

The reaction, according to this invention, may be represented as follows:

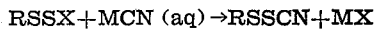

RSSX+MCN (aq) →RSSCN+MX where R represents an alkyl, aralkyl, or aryl group; X is a halogen from the group consisting of chlorine, bromine, and iodine; and M represents an a'kali or alkaline earth metal.

The reaction of this invention can be effected smoothly, quickly and efficiently in ordinarily available, simple apparatus and does not require the observance of any special precautions other than those usually followed when dealing with hydrogen cyanide, when the latter compound is employed in the modification described. For simplicity of operation and from a commercial viewpoint, the use of the aqueous solution of alkali metal hydroxide and hydrogen cyanide may have certain economic advantages.

The thiosulfenyl halides which can be used in the process of this invention are the thiosulfenyl chlorides, bromides and iodides. In general, it is preferred to use the chlorides because of their low cost of manufacture. Different organic thiosulfenyl halides containing a varying number of carbon atoms and of varying carbon configuration may be employed in the present process, which is, however, particularly adaptable to preparation of alkyl sulfenyl thiocyanates in which the alkyl group contains at least one carbon atom and as many as twelve carbon atoms. Thus the alkyl thiosu!fenyl halides can be methyl, ethyl, propyl, isopropyl, butyl, isobutyl, etc, thiosulfenyl halide up to and including dodecyl thiosulfenyl halide. Especially good results have been obtained when the alkyl group is of the tertiary configuration and has between 4 and 12 carbon atoms. Of this group of alkyl thiosulfenyl halides, the tertiary butyl, tertiary pentyl, tertiary hexyl, etc. up to and including the tertiary dodecyl thiosu'fenyl halides are illustrative.

It is particularly efficacious to employ a solvent in the preparation of the thiosulfenyl halides which is also satisfactory in the present process in which the thiosulfenyl halide is preferably dissolved in an organic solution when admixed with an aqueous solution of the cyanide reactant.

The solvent used for the reaction medium and in which the halides may be initially prepared and dissolved is preferably a low-boiling hydrocarbon or mixture of paraffinic hydrocarbons such as pentanes, hexanes, and heptanes. However, other inert organic solvents, such as diethyl ether, chloroform and other low boiling organic solvents, which are inert with respect to both reactants and product, may be employed. The thiosulfenyl halide is preferably present in the solvent in a concentration between 5 and 40 per cent.

The metal cyanides used will preferably be those of the alkali metals, although the cyanides of the alkaline earth metals may be used when desirable. The cyanide salt of any of the various alkali metals may be used but it is generally preferred to employ sodium salt because of its cheapness and ready availability. The metal cyanide is introduced as a solution in water, usually in a concentration of from 5 to 50 per cent, preferably from 10 to 30 per cent.

The preparation of the sulfenyl thiocyanates can be effected by bringing together the reactants at a temperature within the range of about −10° C. to about 50° C. Temperatures without this range do not appear to add any special advantage; however, it will be understood the temperatures employed may extend above or below this range if desired. The preferred temperatures will be between 5° and 30° C., more particularly between 15° and 25° C. It is particularly effective to employ as the solvent a low-boiling hydrocarbon such as pentane and to carry out the reaction at the boiling temperature of the solvent and in the presence of refluxing solvent. By operating in this manner, a constant temperature level is maintained and a certain degree of the agitation of the system is automatically provided.

The time for the reaction to be completed will depend upon the particular thiosulfenyl halide and the temperature employed, as well as upon other conditions which may exist, such as the total quantity of reactants present and the solvent employed. Ordinarily, with quantities of the reactants, as shown in the example below, a time of about 30 minutes to about 90 minutes will be sufficient to substantially complete the reaction after the addition of the metal cyanide or hydrogen cyanide has been accomplished.

The reaction of this invention appears to be substantially independent of the pressure and there appears to be no special advantage in the use of pressures other than the prevailing atmospheric. However, the pressure employed should be at least that required to maintain reactants in a liquid phase at the operating temperature.

As above stated, the thiosulfenyl halide is admixed with an aqueous solution of the metal cyanide in a mol to mol ratio of substantially 1:1, although a small excess of the cyanide, generally not more than 10 mol per cent, can be used when desired. Usually, the thiosulfenyl halides form a colored organic solution while the resulting sulfenyl thiocyanates are clear. In these cases it can be readily observed when reaction is substantially complete, although it is advisable to continue operation for a short time after the coloration has apparently disappeared.

The following example illustrates a particular application of the invention and conditions under which a specific alkyl sulfenyl thiocyanate is prepared.

Example

A reactor was charged with 49 grams of sodium cyanide in 20 per cent aqueous solution and 156 grams of tertiary-butyl thiosulfenyl chloride in 1600 ml. of isopentane. The mixture was maintained at the temperature of boiling isopentane (28° C.) until the color was discharged (about 30 minutes). The mixture was stirred for an additional 30 minutes after which the organic layer was separated from the aqueous phase. The isopentane was flashed off after which the product was distilled under reduced pressure to provide a yield of 133 grams of tertiary-butyl sulfenyl thiocyanate boiling at 65–70° C. under a pressure of 10 mm. and having an index of refraction $n_D^{20}$ 1.5080.

The nature and advantages of the present invention will be clear from the foregoing disclosure and example which is illustrative only and not intended to unduly limit the inherent scope of the invention.

We claim:

1. A process for the preparation of an organic sulfenyl thiocyanate which comprises reacting a thiosulfenyl halide selected from the group consisting of thiosulfenyl chlorides, bromides and iodides with a metal salt of hydrocyanic acid.

2. A process according to claim 1 in which said thiosulfenyl halide is a thiosulfenyl chloride.

3. A process for the preparation of an organic sulfenyl thiocyanate which comprises admixing a thiosulfenyl halide selected from the group consisting of thiosulfenyl chlorides, bromides and iodides with a metal cyanide in the presence of an organic solvent for a time sufficient to form said sulfenyl thiocyanate.

4. A process for the preparation of an alkyl sulfenyl thiocyanate which comprises admixing an alkyl thiosulfenyl halide selected from the group consisting of alkyl thiosulfenyl chlorides, bromides and iodides in the presence of an organic solvent with an aqueous solution of a metal cyanide for a sufficient time to form said alkyl sulfenyl thiocyanate.

5. A process for the preparation of a sulfenyl thiocyanate which comprises admixing a thiosulfenyl halide selected from the group consisting of thiosulfenyl chlorides, bromides and iodides and a metal cyanide at a temperature between −10° C. and 50° C. in the presence of a low-boiling hydrocarbon solvent for a time sufficient to form said sulfenyl thiocyanate.

6. A process according to claim 5 in which said halide is a thiosulfenyl chloride.

7. A process according to claim 5 in which said metal cyanide is an alkali metal cyanide.

8. A process according to claim 5 in which said metal cyanide is sodium cyanide.

9. A process for the preparation of an alkyl sulfenyl thiocyanate which comprises contacting an alkyl thiosulfenyl halide selected from the group consisting of alkyl thiosulfenyl chlorides, bromides and iodides dissolved in an inert organic solvent with an aqueous solution of a metal cyanide at a temperature between −10° C. and 50° C.

10. A process according to claim 9 in which said alkyl thiosulfenyl halide has an alkyl radical containing between one and twelve carbon atoms.

11. A process according to claim 9 wherein said alkyl thiosulfenyl halide has a tertiary alkyl radical.

12. A process according to claim 9 wherein said alkyl thiosulfenyl halide is selected from the group comprised consisting of thiosulfenyl chlorides, bromides and iodides having a tertiary alkyl radical containing from four to twelve carbon atoms.

13. A process for the preparation of tertiary-butyl sulfenyl thiocyanate which comprises reacting tertiary-butyl thiosulfenyl chloride in an excess of isopentane with an aqueous solution of sodium cyanide at a temperature of about 28° C. for a time sufficient to form said butyl sulfenyl-thiocyanate.

CHESTER M. HIMEL.
LEE O. EDMONDS.

REFERENCES CITED

The following references are of record in the file of this patent:

UNITED STATES PATENTS

| Number | Name | Date |
|---|---|---|
| 2,123,082 | Schulze | July 5, 1938 |

OTHER REFERENCES

Zincke et al.: Berichte, vol. 51, pp. 751–767 (1918).